(12) United States Patent
Tengner et al.

(10) Patent No.: US 10,270,328 B2
(45) Date of Patent: Apr. 23, 2019

(54) MULTILEVEL CONVERTER WITH ENERGY STORAGE

(71) Applicant: ABB SCHWEIZ AG, Baden (CH)

(72) Inventors: Tomas Tengner, Västerås (SE); Amel Lachichi, Västerås (SE); Lennart Harnefors, Eskilstuna (SE); Georgios Karmiris, Ludvika (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/548,707

(22) PCT Filed: Feb. 4, 2015

(86) PCT No.: PCT/EP2015/052332
§ 371 (c)(1),
(2) Date: Aug. 3, 2017

(87) PCT Pub. No.: WO2016/124237
PCT Pub. Date: Aug. 11, 2016

(65) Prior Publication Data
US 2018/0026519 A1    Jan. 25, 2018

(51) Int. Cl.
*H02M 1/12* (2006.01)
*H02M 7/797* (2006.01)
(Continued)

(52) U.S. Cl.
CPC ............... *H02M 1/12* (2013.01); *H02J 3/32* (2013.01); *H02J 7/0052* (2013.01);
(Continued)

(58) Field of Classification Search
CPC ............................................ H02M 2007/4835
(Continued)

(56) References Cited

U.S. PATENT DOCUMENTS

| 2008/0198630 A1 | 8/2008 | Hiller |
| 2010/0090533 A1 | 4/2010 | Shimada et al. |

(Continued)

FOREIGN PATENT DOCUMENTS

| CN | 102013691 A | 4/2011 |
| CN | 202712956 U | 1/2013 |

(Continued)

OTHER PUBLICATIONS

Baruschka et al., "Comparison of Cascaded H-Bridge and Modular Multilevel Converters for BESS Application", Energy Conversion Congress and Exposition (ECCE), 2011 IEEE, IEEE, Sep. 17, 2011, XP032067262, pp. 909-916.

(Continued)

*Primary Examiner* — Edward Tso
*Assistant Examiner* — Ahmed H Omar
(74) *Attorney, Agent, or Firm* — Birch, Stewart, Kolasch & Birch, LLP

(57) ABSTRACT

A multilevel power converter includes at least one phase leg. The phase leg includes a plurality of cascaded chain link connected cells, each cell including a capacitor and two semiconductor switches in series, each with an anti-parallel connected diode. The plurality of cascaded chain link connected cells includes first and second cells which form a mirrored cell-pair such that the two semiconductor switches of each of the first and second cells are all connected in series with each other. The converter further includes an energy storage connected between the first and second cells.

20 Claims, 5 Drawing Sheets

(51) Int. Cl.
*H02J 3/32* (2006.01)
*H02M 7/49* (2007.01)
*H02J 7/00* (2006.01)
*H02M 7/219* (2006.01)
*H02M 7/483* (2007.01)
*H02J 7/34* (2006.01)

(52) U.S. Cl.
CPC ............ *H02M 7/219* (2013.01); *H02M 7/49* (2013.01); *H02M 7/797* (2013.01); *H02J 7/345* (2013.01); *H02M 2007/4835* (2013.01)

(58) Field of Classification Search
USPC .......................................................... 320/137
See application file for complete search history.

(56) References Cited

U.S. PATENT DOCUMENTS

| | | |
|---|---|---|
| 2012/0043816 A1 | 2/2012 | Pereira |
| 2012/0229080 A1 | 9/2012 | Leu et al. |

FOREIGN PATENT DOCUMENTS

| | | | | |
|---|---|---|---|---|
| CN | 103199630 A | | 7/2013 | |
| DE | 102012204046 | * | 3/2012 | ............ H02M 7/483 |
| DE | 10 2012 204 046 B3 | | 8/2013 | |
| EP | 1 920 526 A1 | | 5/2008 | |
| EP | 2 525 483 A1 | | 11/2012 | |
| WO | WO 2007/025828 A1 | | 3/2007 | |
| WO | WO 2008/086664 A1 | | 8/2008 | |
| WO | WO 2010/040388 A1 | | 4/2010 | |
| WO | WO 2010/124706 A1 | | 11/2010 | |
| WO | WO 2011/060823 A1 | | 5/2011 | |
| WO | WO 2012/136252 A1 | | 10/2012 | |

OTHER PUBLICATIONS

International Preliminary Report on Patentability, issued in PCT/EP2015/052332, dated Apr. 24, 2017.

International Search Report, issued in PCT/EP2015/052332, dated Nov. 3, 2015.

Maharjan et al., "Active-Power Control of Individual Converter Cells for a Battery Energy Storage System Based on a Multilevel Cascade PWM Converter", IEEE Transactions on Power Electronics, Mar. 2012, vol. 27, No. 3, pp. 1099-1107.

Trintis et al., "Cascaded H-Bridge with Bidirectional Boost Converters for Energy Storage", IEEE, 2011, 10 pages.

Written Opinion of the International Preliminary Examining Authority, issued in PCT/EP2015/052332, dated Jan. 18, 2017.

Written Opinion of the International Searching Authority, issued in PCT/EP2015/052332, dated Nov. 3, 2015.

Zheng et al., "A Hybrid Cascaded Multi-level Converter for Battery Energy Management Applied in Electric Vehicles", IEEE, 2013, 10 pages.

* cited by examiner

MULTILEVEL CONVERTER WITH ENERGY STORAGE

TECHNICAL FIELD

The present disclosure relates to a multilevel power converter comprising at least one phase leg. The phase leg comprises a plurality of cascaded chain link connected cells, each cell comprising a capacitor and two semiconductor switches in series, each with an anti-parallel connected diode.

BACKGROUND

Modular multilevel converters have become popular because of their high efficiencies, their modularity and scalability, as well as for their ability to produce voltage waveforms with low harmonic content which effectively reduce the need for large AC filters.

Several modular multilevel converter topologies exist, of which the M2LC (also called MMLC and MMC) is one of the most popular, in particular in high-voltage direct current (HVDC) applications but also in motor drives etc.

WO 2010/124706 and WO 2011/060823 discloses the traditional half bridge and H-bridge converter cells for M2LC with batteries connected through DC-DC converter interfaces. The DC-DC converters can be used to filter alternating current (AC) components out from the battery current, and to boost the battery voltage to match the direct current (DC) link capacitor voltage.

The M2LC converter may be used as the converter interface for Battery Energy Storage Systems (BESS). The DC energy storage device(s) (Li-ion, Pb-Acid or NaS batteries, supercapacitors or similar) can be connected either to the high voltage common DC link of the M2LC or they can be distributed within the arms of the converter as proposed in WO 2010/124706 and WO 2011/060823.

The very high voltage of the common DC link of the M2LC is a disadvantage in the BESS application, since it is not trivial to build a battery system with such high voltage. The high voltage adds cost for insulation, as well as for fault handling and circuit breakers. The battery system can be equipped with a distributed DC breaker based on insulated-gate bipolar transistors (IGBTs). It adds a significant cost to the system, and produces losses. Low voltage energy storage devices that are distributed within the arms of the modular multilevel converter avoid the challenges related to a high voltage DC system and have the potential to reduce the costs for protection. Distributed energy storage within the arms also provides a higher level of redundancy.

Electrochemical batteries and supercapacitors will vary their voltage during a charge-discharge cycle. The discharge profile of a battery depends mainly on battery chemistry, but is also influenced of battery temperature, charge-discharge rate, aging of battery etc. Any kind BESS converter will need to handle the variable DC voltage of the battery(-ies), and that comes to an expense of de-rating (voltage-wise). Thus, if batteries are interfaced directly in parallel with the cell capacitors, the cell capacitors will have to vary their voltage accordingly, resulting in a significant de-rating of the whole converter.

The DC link capacitor voltage in an M2LC or chain-link converter will be exposed to fundamental and $2^{nd}$ harmonic frequency components. Distributed energy storage devices connected directly to the cells' DC link capacitors will therefore share the harmonic currents. This will lead to increased losses in the storage device, higher operating temperatures and decreased lifetime.

DC-DC converters such can be used to avoid de-rating of the main M2LC converter and to filter harmonics from the battery current.

EP 1 920 526 discloses a converter circuit having at least one phase module comprising an upper and a lower converter valve, with each converter valve comprising at least one two-terminal subsystem. Each two-terminal subsystem comprises four turn-off capable semiconductor switches, four diodes, two unipolar storage capacitors and an electronic circuit. A diode is electrically connected in antiparallel with each turn-off capable semiconductor switch. These four turn-off capable semiconductor switches are electrically connected in series. The two unipolar storage capacitors are electrically connected in series, with this series connection being electrically connected in parallel with the series connection of the turn-off capable semiconductor switches. Each junction between two turn-off capable semiconductor switches forms a reconnecting terminal of the two-terminal subsystem. A junction between the two storage capacitors that are electrically connected in series is electrically connected to a reference potential terminal of the electronic circuit. However, EP 1 920 526 is not related to distributed energy storage within the converter.

SUMMARY

It is an objective of the present invention to provide a power converter with a topology which reduces the need for a DC-DC converter for distributed energy storage which at least alleviates problems with the prior art mentioned above.

According to an aspect of the present invention, there is provided a multilevel power converter comprising at least one phase leg. The phase leg comprises a plurality of cascaded chain link connected cells, each cell comprising a capacitor and two semiconductor switches in series, each with an anti-parallel connected diode. The plurality of cascaded chain link connected cells comprises first and second cells and which form a mirrored cell-pair such that the two semiconductor switches of each of the first and second cells are all connected in series with each other. The converter further comprises an energy storage connected between the first and second cells.

According to another aspect of the present invention, there is provided a mirrored cell-pair comprising a first and a second cell for being comprised in a phase leg of a plurality of cascaded chain link connected cells in a multilevel power converter. Each cell comprises a capacitor and two semiconductor switches in series, each with an anti-parallel connected diode. The first and second cells are connected with each other such that the two semiconductor switches of each of the first and second cells are all connected in series with each other. The first and second cells are configured for being connected to an energy storage such that the energy storage is connected between the first and second cells.

The invention provides a solution that reduces the cost for main converter de-rating related to the voltage variations of batteries or supercapacitors. The solution can also be used for filtering AC components from the battery current, which increases lifetime and performance of the battery. Since the battery is connected between the first and second cells, the invention allows the energy storage to connect over either one or both cell capacitors, using (power electronic) switches. This way, the voltage over the energy storage can be controlled such that the energy storage can be charged or discharged without the use of a DC-DC converter.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The present invention uses what is herein called mirrored cell-pairs in a multilevel power converter with cascaded chain-link connected cells. What is meant with a mirrored cell-pair will now be explained with reference to FIGS. 1 and 2.

Figure 1:
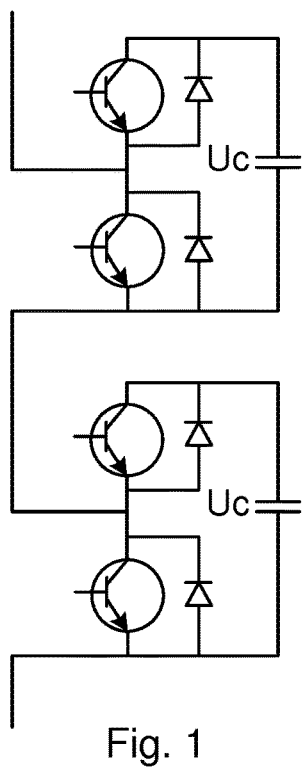
FIG. 1 is a schematic circuit diagram of two chain-link cells connected in a standard fashion for reference.

FIG. 1 illustrates two half-bridge cells which are connected in the standard way for cascaded chain-link connected cells in a multilevel power converter. FIG. 1 is used as reference for the circuit diagram of the mirrored cell-pair shown in FIG. 2.

Figure 2:
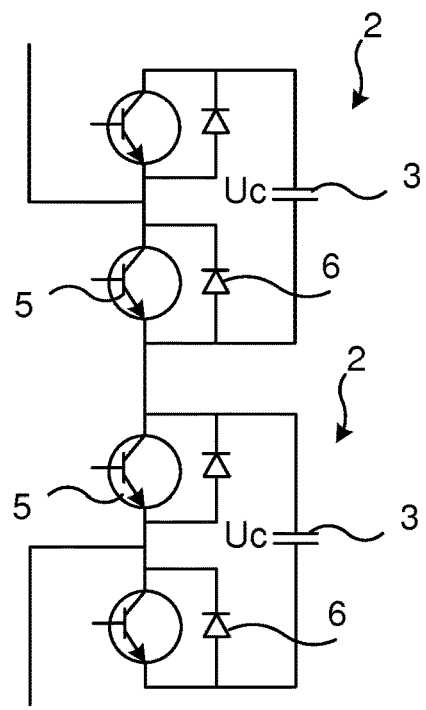
FIG. 2 is a schematic circuit diagram of two chain-link cells connected to each other to form a mirrored cell-pair.

FIG. 2 illustrates two half-bridge cells 2 which are connected such that they form a mirrored cell-pair within the meaning of the present disclosure. Standard symbols are used to illustrate the components (semiconductor to switches 5, diodes 6 and DC link capacitors 3) in each cell 2. The mirroring is from how the cells 2 are connected to each other compared with the other two adjacent cells, one above and one below the two cells shown in the figure, which connections are the inverse to each other which is readily seen when comparing the inter cell connections in FIG. 2 compared with the inter cell connections in FIG. 1. The cells 2 are regular half-bridge cells, typical examples of which are hereby described in more detail. Each cell comprises two series connected semiconductor switches 5, typically turn-off capable semiconductor switches, e.g. insulated-gate bipolar transistors (IGBTs), each semiconductor switch 5 being connected in anti-parallel with a diode 6. Each semiconductor switch with antiparallel diode forms a switch unit, whereby each half-bridge cell 2 thus comprises two such switch units. Each cell 2 also comprises a capacitor 3 connected in parallel with the two switch units of the cell. The way the cells 2 are connected to each other are however not typical, as can be seen in FIG. 2. All the four semiconductor switches 5 (two from each cell 2) are connected in series (such that a current may be conducted downward in FIG. 2 via all four series connected semiconductor switches 5 if they are all in conducting mode), in contrast with the circuit of FIG. 1 where only three of the four semiconductor switches 5 are connected in series. The two capacitors 3 (one from each cell 2) are also connected in series with each other, without being connected via one of the switch units as in FIG. 1, and in parallel with all the four series connected semiconductor switches 5.

Figure 3:
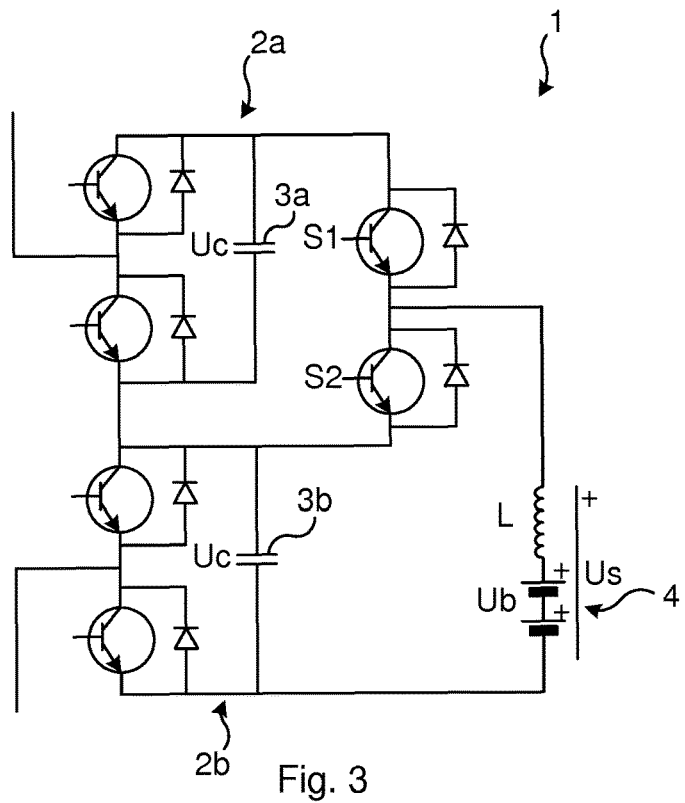
FIG. 3 is a schematic circuit diagram of two chain-link connected cells of an embodiment of a converter in accordance with the present invention.

FIG. 3 illustrates an embodiment of a mirrored cell-pair of a converter 1 in accordance with the present invention. Here, the converter is an M2LC 1 with half-bridge cells 2, of which are shown a first cell 2a and a second cell 2b in any of the arms in the converter 1. The rated mean voltage of each capacitor 3 is Uc. The cells have "mirrored" configurations, as discussed in relation to FIG. 2. An energy storage 4, e.g. a battery or supercapacitor, with voltage Ub and a series smoothing inductor L are connected between the two cells 2a and 2b using two switches, a first switch S1 and a second switch S2. The first and second switches may be of any suitable type, e.g. metal-oxide-semiconductor field-effect transistor (MOSFET) or Integrated Gate-Commutated Thyristor (IGCT), and is not limited to the specific type indicated by the component symbols in the figures. The mean voltage across the energy storage 4 and the inductor L is Us. The energy storage 4 thus has an operation voltage window within the interval Uc and 2Uc.

The energy storage 4 is connected, at one end, to the cells 2 either via the first switch S1 or via the second switch S2 such that the energy storage 4, which is also suitably connected to the second cell 2b at its other end, is either connected over the capacitors 3a and 3b of both cells 2a and 2b or only over the capacitor 3b of the second cell 2b.

As is deduced from the circuit diagram of FIG. 3, by turning on the first switch S1 and off the second switch S2, Us=2Uc. Further, by turning off the first switch S1 and on the second switch S2, Us=Uc. Hence, by turning on the first switch Si and off the second switch S2 Us>Ub and the energy storage 4 is being charged, and by turning off the first switch S1 and on the second switch S2 Us<Ub and the energy storage 4 is being discharged. The energy storage 4 therefore needs to have a voltage rating of Ub<2.0Uc when fully charged and Ub>Uc when discharged. By on average letting Us>Ub, the energy storage 4 is then charged, and by letting Us<Ub, the energy storage 4 is discharged. This way, charging and discharging can be achieved without a DC-DC converter. By pulse width modulation (PWM) control of the first and second switches S1 and S2, the energy storage current can be controlled and fundamental as well as higher frequency AC components can be filtered out from the energy storage current.

Thus, in some embodiments of the present invention, the energy storage 4 is connected via first and second switches S1 and S2 such that when the first switch S1 is turned on and the second switch S2 is turned off, the energy storage 4 is connected over the capacitors 3a and 3b of both first and second cells 2a and 2b, and when the first switch S1 is turned off and the second switch S2 is turned on, the energy storage 4 is connected over the capacitor 3b of the second cell 2b but not over the capacitor 3a of the first cell 2a.

In addition, by turning off both the first and second switches S1 and S2, the energy storage 4 is disconnected from the rest of the converter 1. This operating mode may be used for e.g. fault protection.

Since, in accordance with the embodiment of FIG. 3, one energy storage 4 is connected between the cells 2a and 2b of a mirrored cell-pair, the converter 1 may either be half as many energy storage 4 per arm as there are cells 2 in the arm, or less than half as many.

Figure 4:
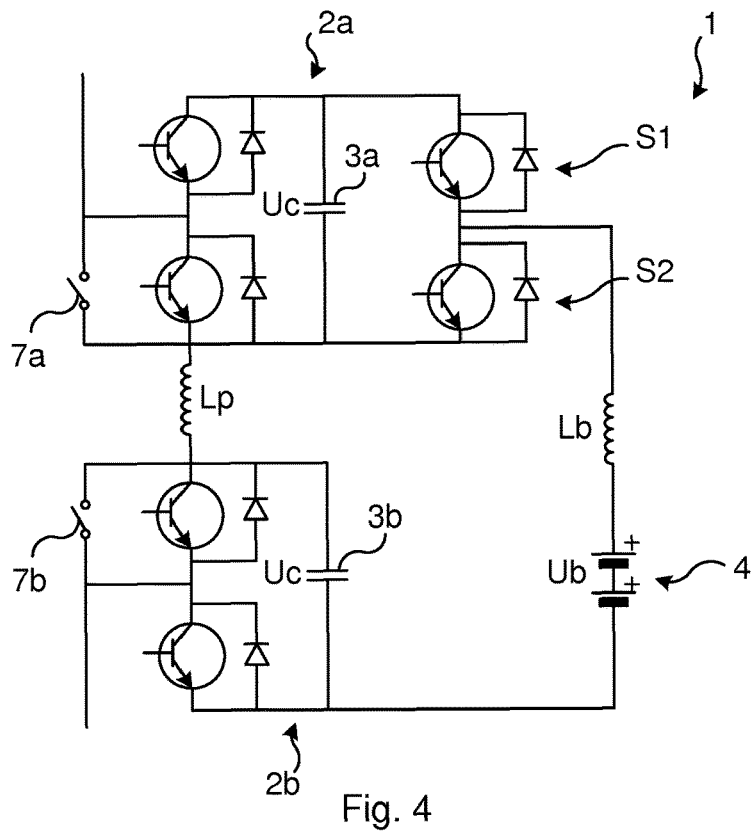
FIG. 4 is a schematic circuit diagram of two chain-link connected cells of another embodiment of a converter in accordance with the present invention.

FIG. 4 illustrates another embodiment of a mirrored cell-pair of a converter 1 in accordance with the present invention. In this embodiment, an inductance Lp is introduced between the first and second cells 2a and 2b, in series with the series connected semiconductor switches 5 of the first and second cells 2a and 2b. As is shown in FIG. 4, all four semiconductor switches 5 of the first and second cells 2a and 2b are connected in series with each other, and the inductance Lp is connected within that series, with the two semiconductor switches 5 of the first cell 2a on one side and the two semiconductor switches 5 of the second cell 2b on the other side. The inductance Lp may be part of the phase inductance of the phase leg of the converter 1 of which the cells 2a and 2b form part, thus making it a distributed phase inductance Lp, reducing the need for a larger inductance for each phase leg.

Thus, in some embodiments of the present invention, the converter 1 further comprises a distributed phase inductance Lp connected between the first and second cells 2a and 2b such that it is connected in series with the series connected semiconductor switches 5 of the first and second cells, between the semiconductor switches 5 of the first cell 2a and the semiconductor switches 5 of the second cell 2b.

The use of a distributed phase inductance Lp between the first and second cells 2a and 2b may be especially advantageous if the first and second switches are, as shown in FIG. 4, both connected to the first cell 2a side of the inductance Lp. The energy storage 4 will then be connected in series with the phase inductance Lp, regardless of which of the first and second switches S1 and S2 is open. The phase inductance Lp may then be used also for smoothing the current of the energy storage 4, reducing or removing the need for the smoothing inductance Lb (which is then made optional).

FIG. 4 also discloses the use of bypass switches 7, a first bypass switch for bypassing the first cell 2a and a second bypass switch 7b for bypassing the second cell 2b. By means of the bypass switches 7a and 7b, one or both of the first and second cells 2a and 2b may be bypassed, without bypassing the phase inductance Lp. The phase inductance Lp may then continue to operate as a distributed part of the phase inductance even if it is desired to disconnect one or both cells 2a and 2b from the converter 1, e.g. for maintenance or if the energy storage 4 has been disconnected.

Thus, in some embodiments of the present invention, the converter 1 further comprises at least one bypass switch 7a or 7b connected in series with the distributed phase inductance Lp, for bypassing one of the first and second cells 2a or 2b.

Figure 5:
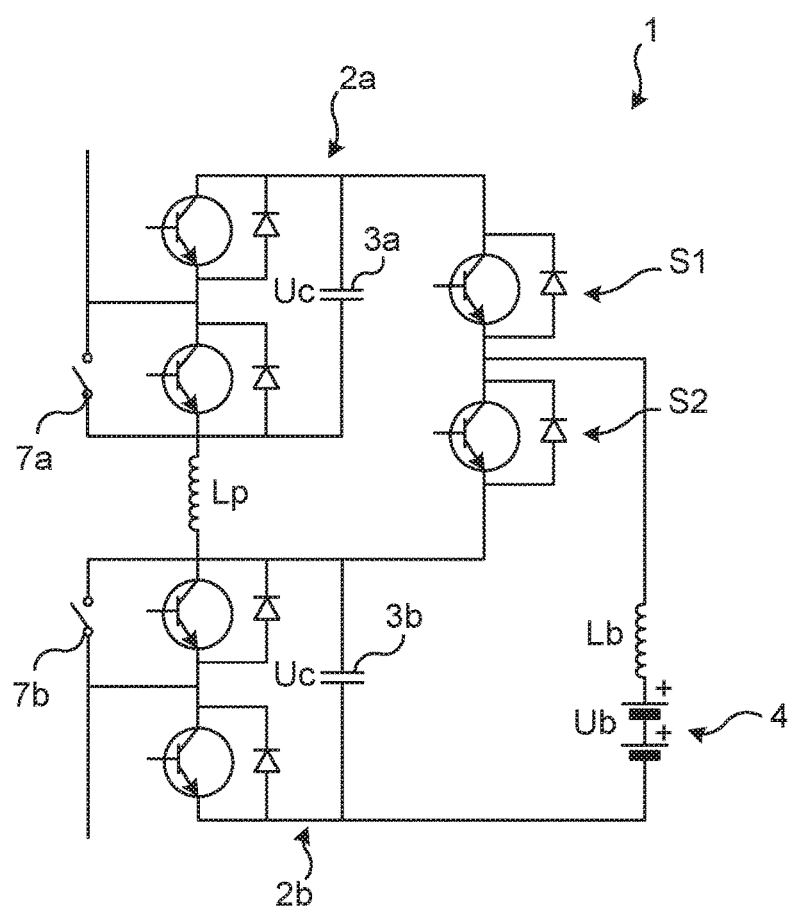
FIG. 5 is a schematic circuit diagram of two chain-link connected cells of another embodiment of a converter in accordance with the present invention.

FIG. 5 illustrates another embodiment of a mirrored cell-pair of a converter 1 in accordance with the present invention. This embodiment is similar to the embodiment of FIG. 4, but with the second switch S2 connected to the second cell 2b side of the phase inductance Lp, whereby (when the second switch S2 is on) the energy storage 4 is connected in parallel with the phase inductance Lp. This is an alternative to the connection of the second switch S2 in FIG. 4, but in this case the smoothing inductance Lb may still be needed.

Figure 6:
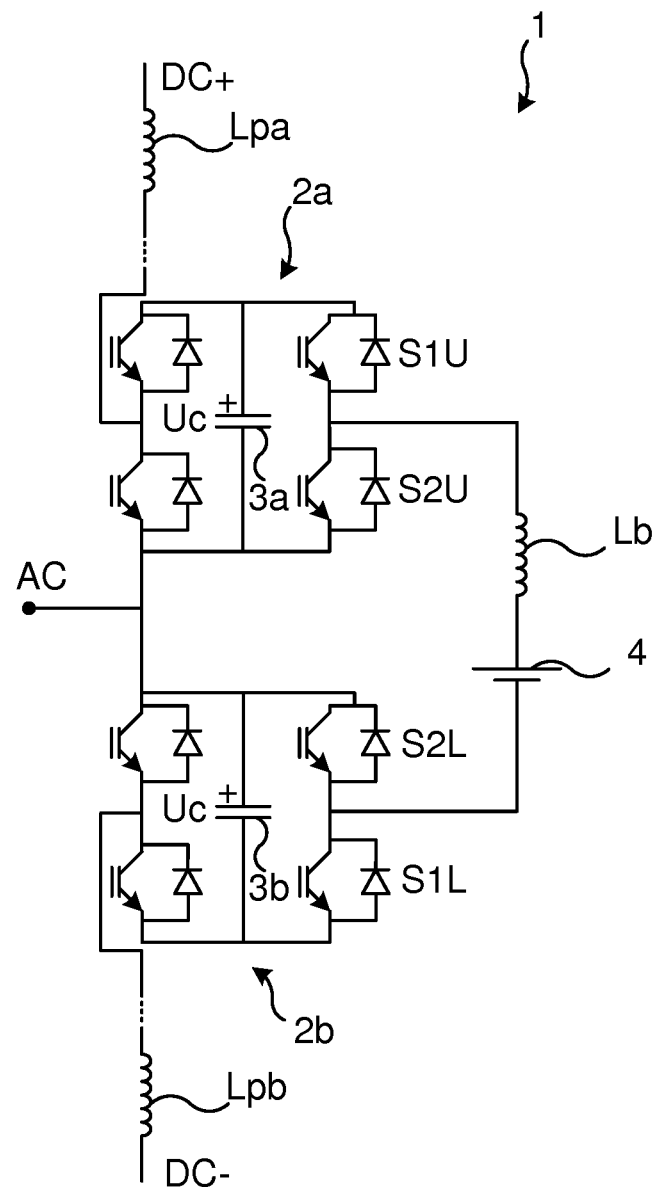
FIG. 6 is a schematic circuit diagram of two chain-link connected cells of another embodiment of a converter in accordance with the present invention.

FIG. 6 illustrates another embodiment of a mirrored cell-pair of a converter 1 in accordance with the present invention. This embodiment shows a case where an AC grid is connected between the first and second cells 2a and 2b, typically in series with the semiconductor switches 5 of the first and second cells. The mirrored cell-pair may e.g. be part of an M2LC converter 1 of a BESS.

The embodiment of FIG. 6 also exhibits the use of switches for controlling the connection of both the first and second ends of the energy storage 4 to the cells 2a and 2b. The first and second switches for controlling the first end of the energy storage 4 which are discussed with reference to FIGS. 3-5 are here called first and second upper switches S1U and S2U, while the additional switches for the second end of the energy storage are called first and second lower switches S1L and S2L. These additional switches introduces further flexibility in how the energy storage is connected between the two cells 2a and 2b, over only the capacitor 3a of the first cell 2a, over only the capacitor 3b of the second cell 2b, over both capacitors 3a and 3b or over none of the capacitors 3a and 3b.

Further, the topology of the embodiment shown in FIG. 6 allows the energy storage voltage Ub to be lower than the capacitor voltage Uc since the energy storage 4 may not be connected over anyone of the capacitors 3a and 3b (i.e. Us is clamped to zero).

Further, FIG. 6 shows that the cells 2a and 2b, together with the first and second upper and lower switches S1U, S2U, S1L and S2L may essentially form full-bridge cells. Thus, in some embodiments of the present invention, the first cell 2a, and/or the second cell 2b, is a full-bridge cell and the first and second switches S1 and S2 (or S1L and S2L) form part of the full-bridge configuration. However, the switches S1U, S2U, S1L and S2L on the energy storage side do not have to be of the same type as the switches of the (half-) cells 2a and 2b (e.g. M2LC cell switches).

In the embodiment of FIG. 6, there is no distributed phase inductance shown between the first and second cells 2a and 2b, but first and second phase inductances Lpa and Lpb are shown at the ends of each arm of the phase leg.

Figure 7:
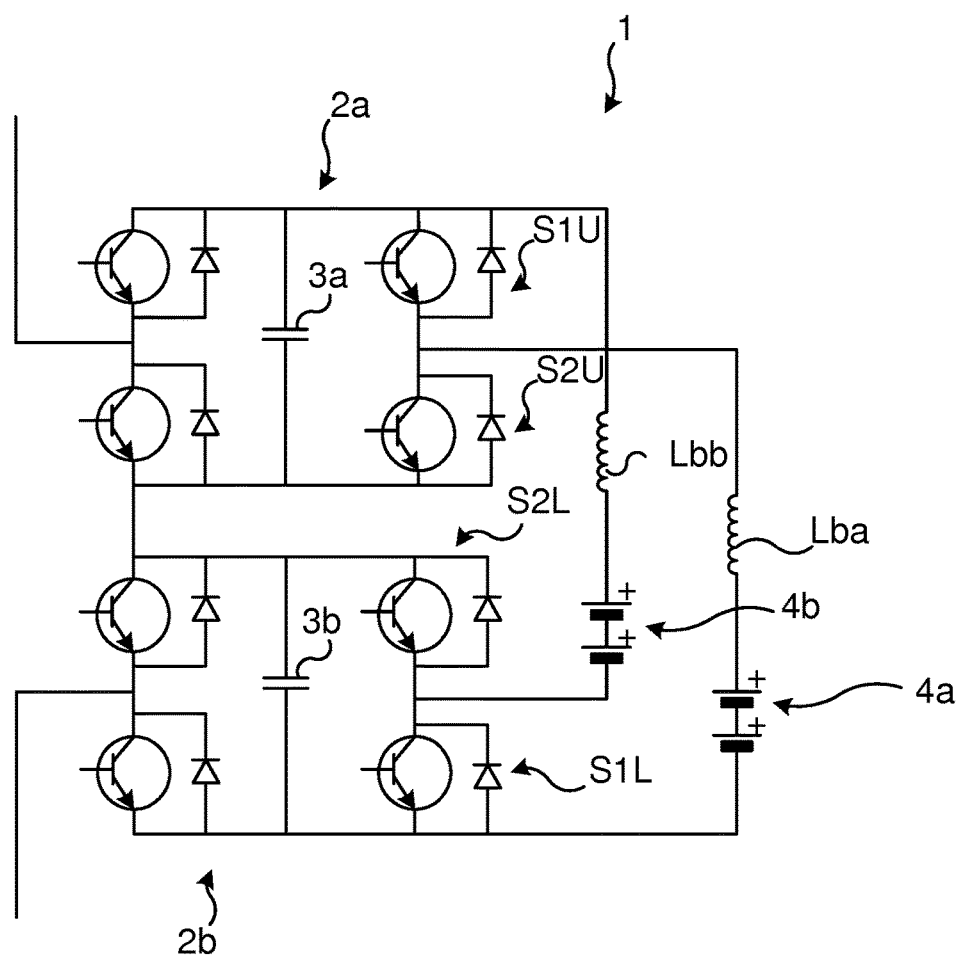
FIG. 7 is a schematic circuit diagram of two chain-link connected cells of another embodiment of a converter in accordance with the present invention.

FIG. 7 illustrates another embodiment of a mirrored cell-pair of a converter 1 in accordance with the present invention. In this embodiment, two separate energy storages 4a and 4b are independently connected between the first and second cells 2a and 2b. The first energy storage 4a is, as in FIGS. 3-5, connected via switches S1U and S2U such that the first energy storage is either connected over both capacitors 3a and 3b of both the first and second cells 2a and 2b or over only the capacitor 3b of the second cell 2b. Similarly, the second energy storage 4b is connected via switches S1L and S2L such that the second energy storage is either connected over both capacitors 3a and 3b of both the first and second cells 2a and 2b or over only the capacitor 3a of the first cell 2a.

Thus, in some embodiments of the present invention, the converter further comprises a second energy storage 4b connected between the first and second cells 2a and 2b. The second energy storage 4b may be connected via first and second lower switches S1L and S2L such that when the first lower switch S1L is turned on and the second switch S2L is turned off, the second energy storage 4b is connected over the capacitors 3a and 3b of both first and second cells 2a and 2b, and when the first switch S1L is turned off and the second switch S2L is turned on, the second energy storage 4b is connected over the capacitor 3a of the first cell 2a but not over the capacitor 3b of the second cell 2b.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A multilevel power converter comprising:
at least one phase leg, the at least one phase leg comprising a plurality of cascaded chain link connected cells and a plurality of switches, wherein the plurality of switches as a whole is connected to each of the plurality of cascaded chain link connected cells, each of the plurality of cascaded chain link connected cells comprises a capacitor and two semiconductor switches in series, and each of the two semiconductor switches is with an anti-parallel connected diode,
wherein the plurality of cascaded chain link connected cells comprises first and second cells forming a mirrored cell-pair such that the two semiconductor switches of each of the first and second cells are all connected in series with each other, and
wherein the converter further comprises a first energy storage connected to the plurality of switches to allow the first energy storage to selectively form a current path between the first energy storage and either one or both of the cell capacitors of the first and second cells by the plurality of switches.

2. A multilevel power converter comprising:
at least one phase leg, the at least one phase leg comprising a plurality of cascaded chain link connected cells, each of the plurality of cascaded chain link connected cells comprising a capacitor and two semiconductor switches in series, each with an anti-parallel connected diode,
wherein the plurality of cascaded chain link connected cells comprises first and second cells forming a mirrored cell-pair such that the two semiconductor switches of each of the first and second cells are all connected in series with each other, and
wherein the converter further comprises a first energy storage connected such as to allow the first energy storage to connect over either one or both of the cell capacitors of the first and second cells by switches,
wherein the first energy storage is connected via first and second switches such that when the first switch is turned on and the second switch is turned off, the first energy storage is connected over the capacitors of both first and second cells, and when the first switch is turned off and the second switch is turned on, the first energy storage is connected over the capacitor of the second cell but not over the capacitor of the first cell.

3. The converter of claim 2, further comprising a distributed phase inductance connected between the first and second cells such that the distributed phase inductance is connected in series with the series connected semiconductor switches of the first and second cells, between the semiconductor switches of the first cell and the semiconductor switches of the second cell.

4. The converter of claim 3, wherein the second switch is connected in series with the distributed phase inductance.

5. The converter of claim 3, further comprising a bypass switch connected in series with the distributed phase inductance, for bypassing one of the first and second cells.

6. The converter of claim 1, wherein the first energy storage is a battery or a supercapacitor.

7. The converter of claim 2, wherein the first cell is a full-bridge cell and the first and second switches form part of the full-bridge configuration.

8. The converter of claim 1, further comprising a second energy storage connected such as to allow the second energy storage to connect over either one or both of the cell capacitors of the first and second cells.

9. The converter of claim 8, wherein the second energy storage is connected via first and second lower switches such that when the first lower switch is turned on and the second lower switch is turned off, the second energy storage is connected over the capacitors of both first and second cells, and when the first lower switch is turned off and the second lower switch is turned on, the second energy storage is connected over the capacitor of the first cell but not over the capacitor of the second cell.

10. The converter of claim 4, further comprising a bypass switch connected in series with the distributed phase inductance, for bypassing one of the first and second cells.

11. The converter of claim 2, wherein the first energy storage is a battery or a supercapacitor.

12. The converter of claim 3, wherein the first energy storage is a battery or a supercapacitor.

13. The converter of claim 4, wherein the first energy storage is a battery or a supercapacitor.

14. The converter of claim 5, wherein the first energy storage is a battery or a supercapacitor.

15. The converter of claim 3, wherein the first cell is a full-bridge cell and the first and second switches form part of the full-bridge configuration.

16. The converter of claim 4, wherein the first cell is a full-bridge cell and the first and second switches form part of the full-bridge configuration.

17. The converter of claim 5, wherein the first cell is a full-bridge cell and the first and second switches form part of the full-bridge configuration.

18. The converter of claim 6, wherein the first cell is a full-bridge cell and the first and second switches form part of the full-bridge configuration.

19. The converter of claim 2, further comprising a second energy storage connected such as to allow the second energy storage to connect over either one or both of the cell capacitors of the first and second cells.

20. The converter of claim 3, further comprising a second energy storage connected such as to allow the second energy storage to connect over either one or both of the cell capacitors of the first and second cells.

* * * * *